United States Patent
Hikita et al.

(10) Patent No.: US 6,724,296 B1
(45) Date of Patent: Apr. 20, 2004

(54) COMMUNICATIONS SYSTEM HAVING AN AUTHENTICATION FUNCTION

(75) Inventors: Junichi Hikita, Kyoto (JP); Haruo Taguchi, Kyoto (JP); Yoshihiro Ikefuji, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/515,107

(22) Filed: Feb. 29, 2000

(30) Foreign Application Priority Data

Mar. 1, 1999 (JP) ............................................. 11-052367

(51) Int. Cl.$^7$ ........................ G05B 19/00; G05B 23/00; G06F 7/00; G08B 29/00; H04B 1/00
(52) U.S. Cl. ..................... 340/5.61; 340/5.21; 340/5.81
(58) Field of Search ................................ 340/5.21, 5.2, 340/5.4, 5.41, 5.54, 5.8, 5.81, 5.86, 5.61, 10.51, 10.52, 5.65, 825.77; 235/380, 441, 443, 492; 713/200, 201, 202, 182, 157, 155

(56) References Cited

U.S. PATENT DOCUMENTS

| | | | | |
|---|---|---|---|---|
| 4,581,588 A | * | 4/1986 | Schreiber ..................... 330/107 |
| 4,652,698 A | * | 3/1987 | Hale et al. .................... 713/155 |
| 4,710,613 A | * | 12/1987 | Shigenaga ..................... 235/380 |
| 4,916,738 A | * | 4/1990 | Chandra et al. ............. 713/159 |
| 4,993,068 A | * | 2/1991 | Piosenka et al. .............. 380/23 |
| 5,101,373 A | * | 3/1992 | Tanioka et al. ............... 713/200 |
| 5,513,245 A | * | 4/1996 | Mizikovsky et al. .......... 379/59 |
| 5,544,246 A | * | 8/1996 | Mandelbaum et al. ........ 380/23 |
| 5,613,214 A | * | 3/1997 | Shirasawa et al. .......... 455/54.1 |
| 5,761,309 A | * | 6/1998 | Ohashi et al. ................. 380/25 |
| 5,970,144 A | * | 10/1999 | Chan et al. .................... 380/23 |
| 6,134,431 A | * | 10/2000 | Matsumoto et al. ........ 455/411 |
| 6,263,319 B1 | * | 7/2001 | Leatherman ................. 705/30 |
| 6,515,575 B1 | * | 2/2003 | Kataoka ...................... 340/5.8 |

FOREIGN PATENT DOCUMENTS

EP          0068805 A1    1/1983

* cited by examiner

Primary Examiner—Michael Horabik
Assistant Examiner—Nam Nguyen
(74) Attorney, Agent, or Firm—Arent Fox PLLC (57) ABSTRACT

In a communications system having an authentication function, a relaying apparatus 3 is used. This relaying apparatus 3 has an authentication circuit 6 for checking whether reader/writers 2-1 to 2-n are authentic or not by detecting whether or not the authentication signals from the reader/writers 2-1 to 2-n have been subjected to a predetermined calculation operation within the reader/writers 2-1 to 2-n, a multiplexer 5 for switching the lines connecting between the reader/writers 2-1 to 2-n and, a PC 4 in accordance with the results of the authentication processes performed by the authentication circuit 6, and a calculation circuit 7 for performing a predetermined calculation operation on the authentication signals from the reader/writers 2-1 to 2-n and for feeding them back to the reader/writers 2-1 to 2-n.

13 Claims, 5 Drawing Sheets

FIG. 8 PRIOR ART

COMMUNICATIONS SYSTEM HAVING AN AUTHENTICATION FUNCTION

BACKGROUND OF THE INVENTION

1. Field of the Invention

The present invention relates to a communications system in which communications terminals for communicating with external communications apparatuses are managed in a concentrated manner by a computer functioning as a central control apparatus, and particularly to a communications system in which an authentication process is performed between such communications terminals and transponders that communicate therewith.

2. Description of the Prior Art

Conventionally, communications systems are in practical use that employ IC cards or magnetic cards as transponders to manage the lift facilities at a skiing ground, to sort pieces of baggage, to monitor people entering and leaving a room, and for other purposes. A communications system of this type consists basically of an interrogator portion and a transponder portion with which the interrogator portion communicates. Here, the interrogator portion is composed of, on the one hand, communications terminals, each provided with a reader/writer for communicating directly with a transponder and provided with a personal computer (hereinafter referred to simply as a "PC") serving as a local control apparatus for analyzing the signal received from the transponder and producing a signal to be transmitted back to the transponder, and, on the other hand, another PC serving as a central control apparatus (i.e. a host computer) for managing in a centralized manner the above-mentioned PCs of the communications terminals as slave computers.

Figure 8:
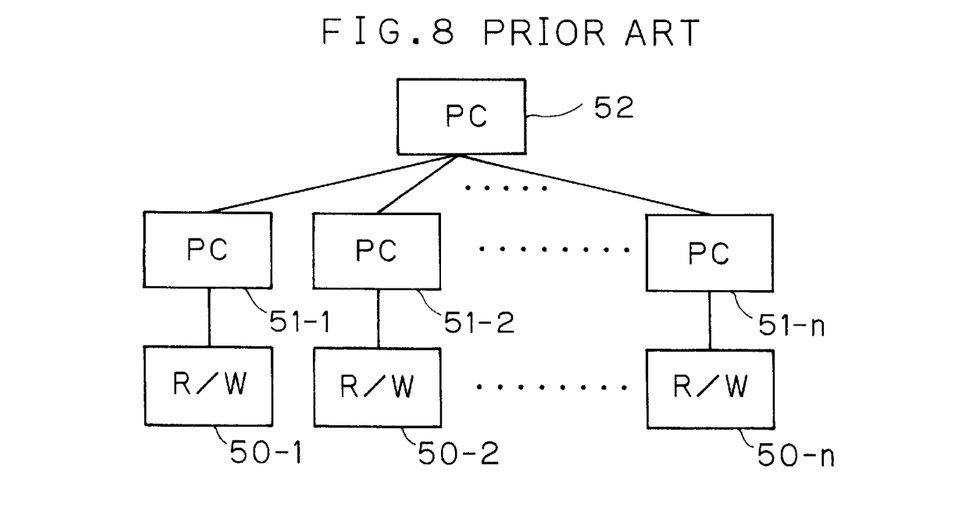
FIG. 8 is a block diagram showing the configuration of a conventional communications system.

In a conventional communications system as described above, the interrogator portion, composed of a plurality of communications terminals and a central control apparatus, has a system configuration as shown in FIG. 8, which is a block diagram thereof. Specifically, a plurality of reader/writers 50-1 to 50-n, each capable of communicating with a transponder and having an authentication means, are connected individually to PCs 51-1 to 51-n so as to be controlled thereby, and these PCs 51-1 to 51-n are, as slave computers, connected to another PC 52 serving as their host computer so as to construct together a LAN (local area network).

How this communications system works will be described briefly below, taking as an example a case where it is applied to a system for monitoring people entering and leaving a room. When a person holding a magnetic card, on which personal information is recorded such as the time period in which the person is permitted in the room and the card ID (identification) number, inserts the magnetic card into one of the reader/writers 50-1 to 50-n, the person is requested to enter a secret number, and an authentication process is performed to determine whether to open a door or not to permit the person to enter or leave the room. Here, suppose that the magnetic card is inserted into the reader/writer 50-1. If, on the basis of the secret number entered by the person, the reader/writer 50-1 authenticates the magnetic card, communication is established between them, and the personal information recorded on the magnetic card is read.

This personal information is transmitted to the PC 51-1 that controls the reader/writer 50-1, and then the PC 51-1 determines whether to permit the person to enter or leave the room or not. If the PC 51-1 determines to permit the person in or out of the room, it responds by transmitting back a command signal requesting the door connected to the reader/writer 50-1 to be opened. Thereafter, the reader/writer 50-1 controls the door so that it will be unlocked, and also communicates with the magnetic card to record thereon the time at which the person entered or left the room. The information that this particular magnetic card holder entered or left the room is transmitted from the PC 51-1 to the PC 52 serving as the host computer, which thereby keeps track of where the magnetic card holder currently is. Moreover, from this PC 52, it is possible to manage faults occurring in the PCs 51-1 to 51-n that serve as slave computers.

In recent years, in a communications system of this type, IC cards have been taking the place of magnetic cards for their convenience. In such cases, to achieve higher security, both IC cards and reader/writers are provided individually with an authentication means that generates a rolling code to permit them to check, when communication is requested from a communication partner, whether the communication partner is authentic or not.

In this way, this conventional communications system, in which a plurality of reader/writers 50-1 to 50-n are connected individually to PCs 51-1 to 51-n so as to be controlled thereby and those PCs 51-1 to 51-n are connected to another PC 52 so as to construct together a LAN, requires PCs to be provided one for each of the communications terminals used therein, and thus inevitably has a complicated system configuration. Thus, a communications system of this type is expensive to introduce and maintain, and in addition troublesome to manage.

This system can be simplified, for example, by providing a hub serving as a relaying apparatus between the reader/writers and the PC serving as the host computer so that the reader/writers will be connected through the hub directly to the host PC so as to construct together a LAN. However, in this case, there is no security function performed between the reader/writers and the host PC such as the rolling codes and secret numbers exchanged between the reader/writers and the transponders. As a result, once a reader/writer erroneously authenticates an inauthentic transponder, there is a risk of the host PC being readily accessed by that transponder, allowing the inauthentic transponder to pretend to be an authentic transponder.

SUMMARY OF THE INVENTION

An object of the present invention is to provide a communications system that has a simpler system configuration in its interrogator portion including a plurality of communications terminals and that nevertheless offers higher security in communication.

To achieve the above object, according to the present invention, a communications system having an authentication function is provided with: a plurality of communications terminals for communicating individually with external communications apparatuses; a central control apparatus for controlling the communications terminals and for exchanging data related to the communications terminals and the external communications apparatuses with the communications terminals; and a relaying apparatus composed of a switching portion for selectively connecting one of the communications terminals to the central control apparatus and a central authentication circuit for checking whether the individual communications terminals are authentic or not.

In this communications system, whether the communications terminals are authentic or not is checked by the central authentication circuit provided in the relaying apparatus. If a communications terminal is found to be inauthentic by the central authentication circuit, the switching portion provided in the relaying apparatus prohibits it from being connected by way of a data transfer line to the central control apparatus. On the other hand, if a communications terminal is found to be authentic by the central authentication circuit, whenever it is accessed by an external communications apparatus requesting communication therewith, the switching portion provided in the relaying apparatus selects the communications terminal and connects it by way of a data transfer line to the central control apparatus to establish communication between them. Here, the authentication process performed by the communications terminal to check whether the external communications apparatus is authentic or not is performed independently of the authentication process performed by the relaying apparatus to check whether the communications terminal is authentic or not.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
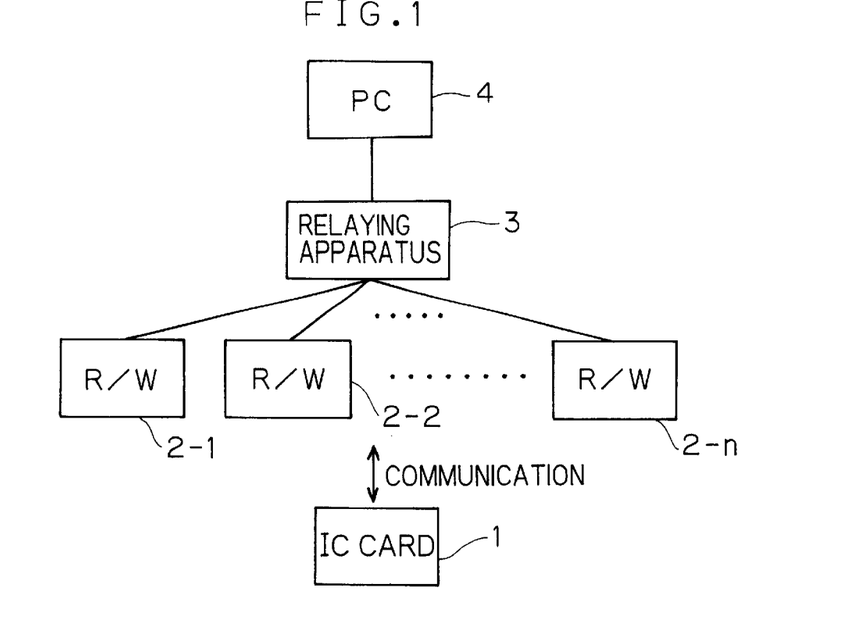
FIG. 1 is a block diagram showing the configuration of the communications system of a first embodiment of the invention.
Figure 2:
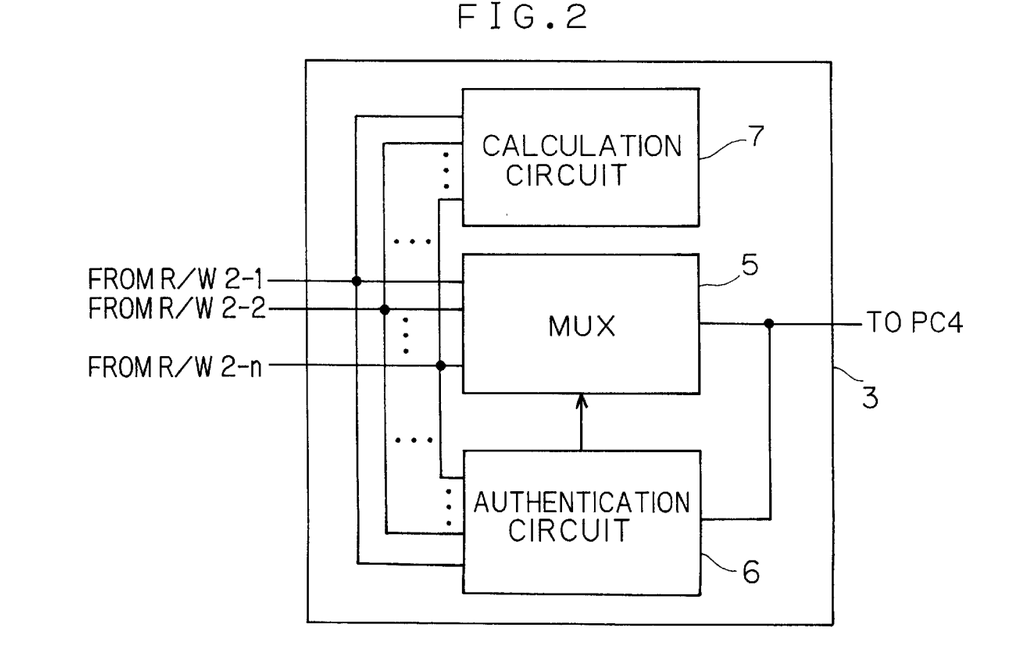
FIG. 2 is a block diagram showing the internal configuration of the relaying apparatus employed in the communications system shown in FIG. 1.
Figure 3:
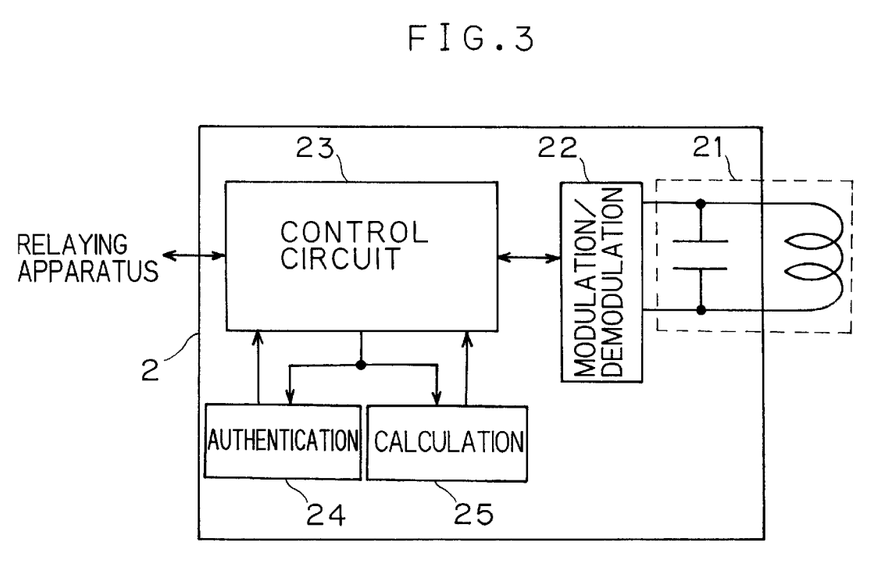
FIG. 3 is a block diagram showing the internal configuration of the reader/writer employed in a communications system embodying the invention.
Figure 4:
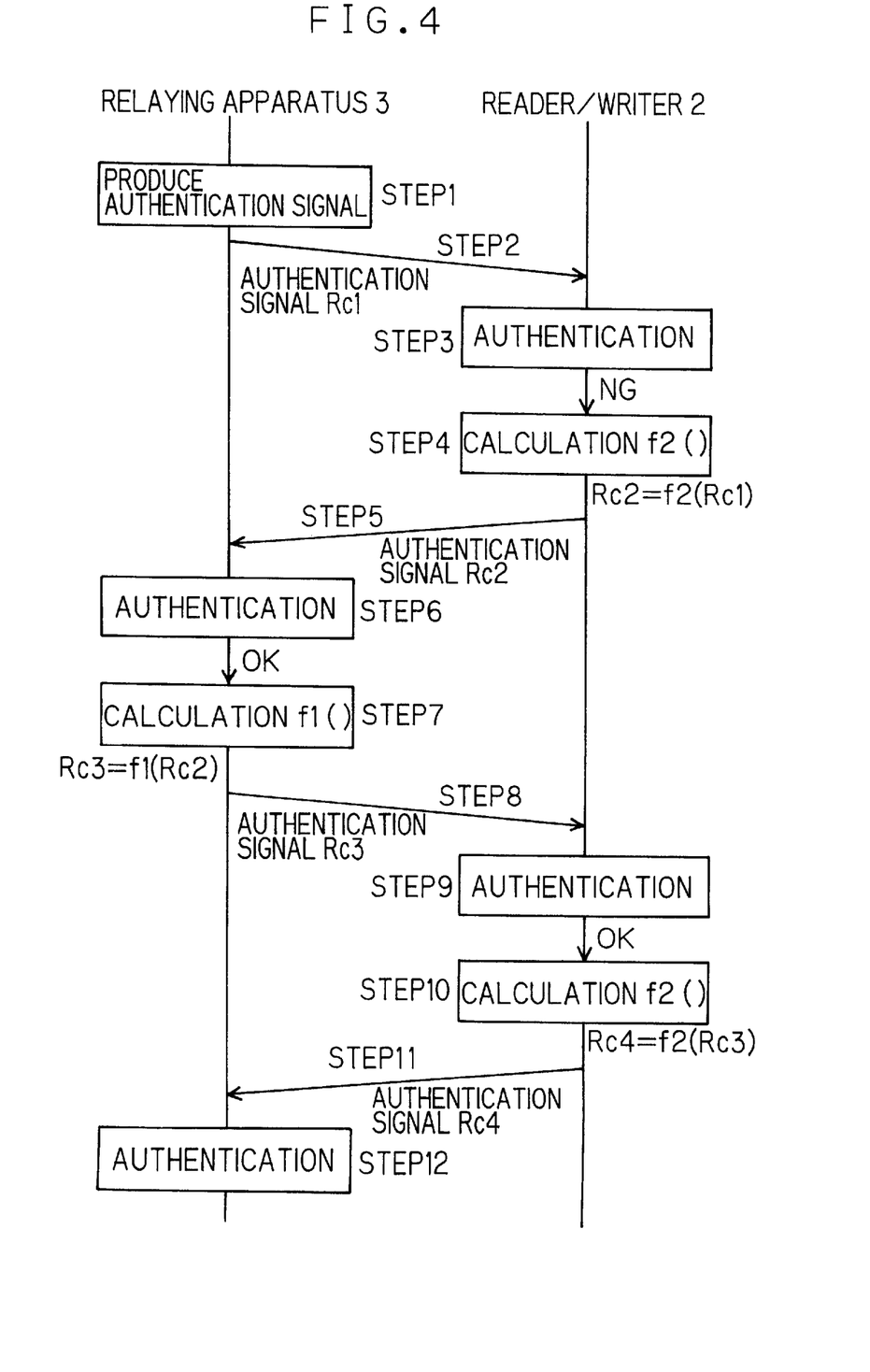
FIG. 4 is a time chart showing the operation of a communications system embodying the invention.
Figure 5:
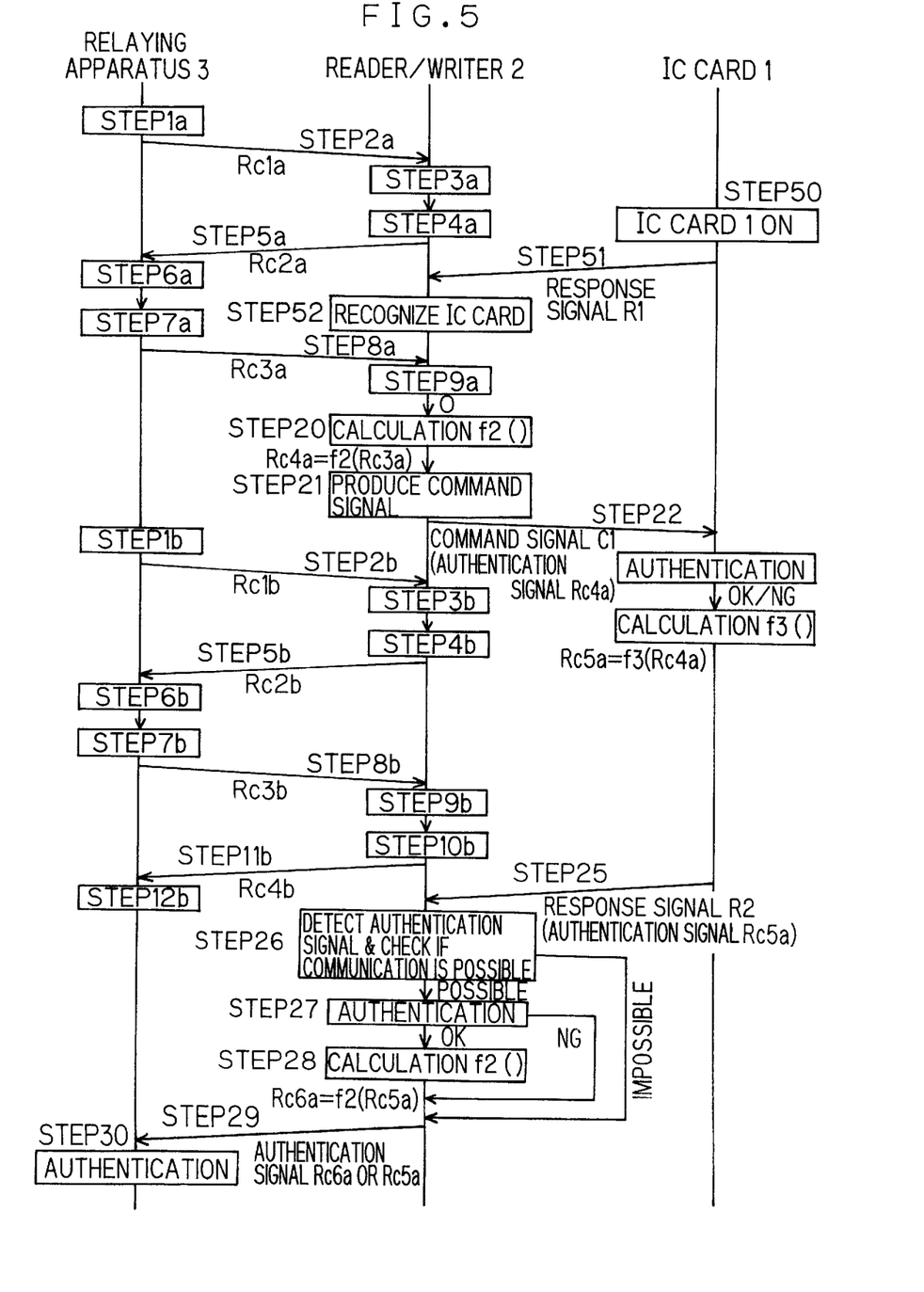
FIG. 5 is a time chart showing the operation of a communications system embodying the invention.

First, a first embodiment of the present invention will be described with reference to the drawings relevant thereto. FIG. 1 is a block diagram showing the communications system of the first embodiment. FIG. 2 is a block diagram showing the internal configuration of the relay apparatus employed in this embodiment. FIG. 3 is a block diagram showing the internal configuration of the reader/writer employed in this embodiment. FIGS. 4 and 5 are time charts showing the operation of the communications system shown in FIG. 1. It is to be noted that, throughout the present specification, the symbol "NG" indicates that an authentication process has found a communication partner to be not authentic, and that the symbol "OK" indicates that an authentication process has found a communication partner to be authentic.

The communications system shown in FIG. 1 is composed of reader/writers 2-1 to 2-n functioning as communications terminals that communicate with an IC card 1 on a non-contact basis, a relaying apparatus 3 to which the reader/writers 2-1 to 2-n are connected, and a PC 4 functioning as a central control apparatus to which the relaying apparatus 3 is connected and by which the reader/writers 2-1 to 2-n are controlled in a centralized manner.

In this communications system, as shown in FIG. 2, the relaying apparatus 3 has a multiplexer 5 for switching the data transfer lines connecting between the reader/writers 2-1 to 2-n and the PC 4, an authentication circuit 6 for detecting the authentication signals transmitted from the reader/writers 2-1 to 2-n to check whether the reader/writers 2-1 to 2-n are authentic or not on the basis of those authentication signals, and a calculation circuit for performing a predetermined calculation operation f1( ) on the authentication signals transmitted from the reader/writers 2-1 to 2-n to produce authentication signals to be transmitted back.

FIG. 3 shows an example of the internal configuration of the reader/writers 2-1 to 2-n shown in FIG. 1. Specifically, as shown in FIG. 3, the reader/writers 2-1 to 2-n shown in FIG. 1 each have a tuning circuit 21 for exchanging signals with an IC card 1, a modulation/demodulation circuit 22 for demodulating a response signal received through the tuning circuit 21 and for modulating a command signal fed thereto from a control circuit 23, a control circuit 23 for controlling the entire reader/writer and for producing a command signal, an authentication circuit 24 that receives an authentication signal from the control circuit 23 and that checks whether the IC card 1 or the relaying apparatus 3 is authentic or not on the basis of the received authentication signal, and a calculation circuit 25 that receives the authentication signal from the control circuit 23 and that performs thereon a predetermined calculation operation f2( ).

When electric power starts being supplied to the reader/writers 2-1 to 2-n and to the relaying apparatus 3, authentication processes start being performed between the reader/writers 2-1 to 2-n and the relaying apparatus 3. Now, how these authentication processes are performed between the reader/writers 2-1 to 2-n and the relaying apparatus 3 will be described with reference to FIG. 4. First, in the relaying apparatus 3, the calculation circuit 7 produces an arbitrary signal as an authentication signal Rc1 that is to be used by the reader/writer 2 to perform an authentication process (STEP 1). This authentication signal Rc1 is then transmitted to the reader/writer 2 (STEP 2). Here, the authentication signal Rc1 is an arbitrary signal, and has not yet been subjected to the calculation operation f1( ) performed by the calculation circuit 7.

When the reader/writer 2 receives this authentication signal Rc1, the control circuit 23 feeds the authentication signal Rc1 to the authentication circuit 24 to check whether or not the authentication signal Rc1 has already been subjected to the calculation operation f1( ) within the relaying apparatus 3. Here, since this authentication signal Rc1 has not yet been subjected to the calculation operation f1( ), the authentication process results in "NG", and thus the reader/writer 2, regarding the relaying apparatus 3 as inauthentic, does not authenticate it (STEP 3).

At the same time, the control circuit 23 feeds the authentication signal Rc1 to the calculation circuit 25 to perform thereon the calculation operation f2( ) (STEP 4). The signal f2(Rc1) resulting from this calculation operation f2( ) performed by the calculation circuit 25 is, as an authentication signal Rc2, fed to the control circuit 23, which then transmits this signal Rc2 to the relaying apparatus 3 (STEP 5).

When the relaying apparatus 3 receives this authentication signal Rc2, the authentication circuit 6 checks whether or not the authentication signal Rc2 has already been subjected to the calculation operation f2( ) within the reader/writer 2.

Here, since this authentication signal Rc2=f2(Rc1) has already been subjected to the calculation operation f2( ), the authentication process results in "OK", and thus the relaying apparatus 3 authenticates the reader/writer 2 (STEP 6). At the same time, the control circuit 23 performs the calculation operation f1( ) on the authentication signal Rc2 (STEP 7). The signal f1(Rc2) resulting from this calculation operation f1( ) performed by the calculation circuit 7 is, as an authentication signal Rc3, fed to the reader/writer 2 (STEP 8).

When the reader/writer 2 receives this authentication signal Rc3, the control circuit 23 feeds the authentication signal Rc3 to the authentication circuit 24. Here, since this authentication signal Rc3=f1(Rc2) has already been subjected to the calculation operation f1( ), the authentication process results in "OK", and thus the reader/writer 2 authenticates the relaying apparatus 3 (STEP 9). At the same time, as in STEPs 4 and 5 described above, the control circuit 23 feeds the authentication signal Rc3 to the calculation circuit 25 to perform the calculation operation f2( ) thereon (STEP 10). The signal f2(Rc3) resulting from the calculation operation f2( ) performed by the calculation circuit 25 is, as an authentication signal Rc4, to the control circuit 23, which then transmits this signal Rc4 to the relaying apparatus 3 (STEP 11).

When the relaying apparatus 3 receives the authentication signal Rc4, as in STEP 6 described above, the authentication circuit 6 checks whether or not this authentication signal Rc4 has already been subjected to the calculation operation f2( ) within the reader/writer 2. Here, since this authentication signal Rc4=f2(Rc3) has already been subjected to the calculation operation f2( ), the authentication process results in "OK", and thus the relaying apparatus 3 authenticates the reader/writer 2 (STEP 12). In this way, if the relaying apparatus 3 authenticates the reader/writer 2 twice while the reader/writer 2 and the relaying apparatus 3 are communicating with each other in STEPs 1 through 12, it is recognized that the reader/writer 2 and the relaying apparatus 3 have successfully authenticated each other.

This session of communication conducted in STEPs 1 through 12 is repeated sequentially between each of the reader/writers 2-1 to 2-n and the relaying apparatus 3 so that each of the reader/writers 2-1 to 2-n and the relaying apparatus 3 authenticate each other. If, in STEP 6, the authentication process performed by the authentication circuit 6 provided in the relaying apparatus 3 results in "NG", the operations starting in STEP 1 are performed again. If, in STEP 9, the authentication process performed by the authentication circuit 24 provided in the reader/writer 2 results in "NG", the authentication signal is transmitted back to the relaying apparatus 3 without being subjected to the calculation operation performed by the calculation circuit 25. In this case, the relaying apparatus 3 does not authenticate the reader/writer 2, and the operations starting in STEP 1 are performed again. If neither of the reader/writer 2 and the relaying apparatus 3 authenticates the other even when an authentication process is attempted a plurality of times, the authentication process is regarded as having resulted in "NG" and is terminated.

As a result of the above-described authentication processes performed between the reader/writers 2-1 to 2-n and the relaying apparatus 3 in STEPs 1 through 12, the relaying apparatus 3 stores within the authentication circuit 6 the results of the authentication processes it performed with respect to the reader/writers 2-1 to 2-n, and, at the same time, transmits those authentication results from the authentication circuit 6 to the PC 4. Thereafter, to check whether the reader/writers 2-1 to 2-n have recognized an IC card or not, the relaying apparatus 3 transmits authentication signals to the reader/writers 2-1 to 2-n at regular intervals, and, at the same time, the reader/writers 2-1 to 2-n radiate weak radio waves individually to recognize an IC card 1. Here, unless the authentication processes performed in the reader/writer 2 and in the relaying apparatus 3 both result in "OK", the relaying apparatus 3 does not transmit the authentication signal to the reader/writer 2. That is, this reader/writer 2 is kept out of use in communication.

Now, the authentication processes performed among the IC card 1, the reader/writer 2, and the relaying apparatus 3 after the reader/writer 2 and the relaying apparatus 3 have authenticated each other will be described with reference to FIG. 5. When, as in STEP 50, the tuning circuit (not shown) provided in the IC card 1 has tuned in to the weak radio wave transmitted from the reader/writer 2, the rectifier circuit (not shown) provided in the IC card 1 produces electric power. This electric power is supplied to the individual circuits provided in the IC card 1, and thus the IC card 1 is turned on. When the IC card 1 is turned on, it transmits from its tuning circuit a response signal R1 requesting the reader/writer 2 to recognize that the IC card 1 is located sufficiently close thereto (STEP 51). When the reader/writer 2 receives this response signal R1 through its tuning circuit 21, it recognizes the presence of the IC card 1 through the operation of the control circuit 23 (STEP 52).

Now, suppose that the operations in STEPs 50 through 52 shown in FIG. 5 have been performed between the IC card 1 and the reader/writer 2, and the reader/writer 2 has already recognized the IC card 1. Here, although the reader/writer 2 and the relaying apparatus 3 have already authenticated each other, the operations in STEPs 1a through 9a, which correspond to STEPs 1 through 9 shown in FIG. 4, are performed again between the reader/writer 2 and the relaying apparatus 3. It is to be noted that the authentication signals Rc1a to Rc3a here correspond to the authentication signals Rc1 to Rc3 in FIG. 4.

When these operations are completed, in the reader/writer 2, the calculation circuit 25 performs the calculation operation f2( ) on the authentication signal Rc3a to produce an authentication signal Rc4a, and feeds this authentication signal Rc4a to the control circuit 23 (STEP 20). The control circuit 23 then produces a command signal C1 to which this authentication signal Rc4a is added (STEP 21). This command signal C1 is modulated by the modulation/demodulation circuit 22 and is then transmitted from the tuning circuit 21 (STEP 22).

When the IC card 1 receives this command signal C1 through its tuning circuit, it checks whether or not the authentication signal Rc4a added to this command signal C1 has already been subjected to the calculation operation f2( ) (STEP 23). Here, since this authentication signal Rc4a =f2(Rc3a ) has already been subjected to the calculation operation f2( ), the authentication process results in "OK", and thus the IC card 1 authenticates the reader/writer 2. At the same time, the authentication signal Rc4a is subjected to a predetermined calculation operation f3( ) to produce an authentication signal Rc5a (STEP 24). Then, a response signal R2 to which this authentication signal Rc5a is added is transmitted from the tuning circuit (STEP 25). It is to be noted that, if the IC card 1 authenticates the reader/writer 2, data indicating that communication is possible is added to the data included in the response signal R2; on the other hand, the authentication signal Rc5a is always added to the response signal R2 irrespective of the result of the authentication process.

While these operations in STEPs 20 through 25 are being performed between the IC card 1 and the reader/writer 2, the authentication processes in STEPs 1b through 12b are performed between the reader/writer 2 and the relaying apparatus 3. Specifically, if, after the relaying apparatus 3 has transmitted the authentication signal Rc3a in STEP 8a, there is no response from the reader/writer 2 within a predetermined period of time, then, in STEP 1b corresponding to STEP 1 shown in FIG. 4, an authentication signal Rc1b corresponding to the authentication signal Rc1 is produced. Thereafter, the operations in STEPs 2b through 12b corresponding to STEPs 2 through 12 shown in FIG. 4 are performed. It is to be noted that the authentication signals Rc1b to Rc4b here correspond to the authentication signals Rc1 to Rc4 in FIG. 4.

While the mutual authentication processes in STEPs 1b through 12b are being performed between the reader/writer 2 and the relaying apparatus 3, the reader/writer 2 receives through its tuning circuit 21 the response signal R2 transmitted from the IC card 1 in STEP 25. When the reader/writer 2 receives the response signal R2, the modulation/demodulation circuit 22 demodulates it and then the control circuit 23 detects the authentication signal Rc5a therefrom (STEP 26). Moreover, on the basis of the response signal R2, the control circuit 23 recognizes whether the IC card 1 has become ready for communication or not.

This authentication signal Rc5a is then fed to the authentication circuit 24, which then checks whether or not this authentication signal Rc5a has already been subjected to the calculation operation f3( ) (STEP 27). Here, since this authentication signal Rc5a=f3(Rc4a) has already been subjected to the calculation operation f3( ), the authentication process results in "OK", and thus the reader/writer 2 authenticates the IC card 1. At the same time, the calculation circuit 25 performs the calculation operation f2( ) on the authentication signal Rc5a to produce an authentication signal Rc6a (STEP 28). It is to be noted that, if the authentication process results in "NG" either in the IC card 1 or in the reader/writer 2, then the authentication signal Rc5a is transmitted to the relaying apparatus 3 without being subjected to the calculation operation f2( ) performed by the calculation circuit 25.

Here, since the authentication process performed in the IC card 1 with respect to the reader/writer 2 results in "OK", in STEP 26, it is possible to recognize, on the basis of the response signal R2, that communication is possible. In this case, the authentication signal Rc6a is transmitted to the relaying apparatus 3 (STEP 29). Then, the authentication circuit 6 checks whether or not this authentication signal Rc6a has already been subjected to the calculation operation f2( ) (STEP 30). Here, since this authentication signal Rc6a =f2(Rc5a) has already been subjected to the calculation operation f2( ), the authentication process results in "OK", and thus the relaying apparatus 3 authenticates the reader/writer 2.

When the relaying apparatus 3 authenticates the reader/writer 2 in this way, then the reader/writer 2 and the relaying apparatus 3 have already authenticated each other and also the IC card 1 and the reader/writer 2 have already authenticated each other, and thus the multiplexer 5 provided in the relaying apparatus 3 connects the reader/writer 2 to the PC 4 by way of data transfer lines. Now that the reader/writer 2 and the PC 4 are connected together in this way, the IC card 1 communicates with the PC 4 through the reader/writer 2 and the relaying apparatus 3.

Moreover, when the authentication process results in "NG" either in the IC card 1 or in the reader/writer 2, the authentication signal that has been subjected to the calculation operation f2( ) in STEP 30 is not detected, and thus the authentication process performed by the authentication circuit 6 results in "NG". In this case, the operations starting in STEP 1a are performed again. If such an authentication process results in "NG" even if attempted a plurality of times, the authentication circuit 6 provided in the relaying apparatus 3 transmits a signal indicating the authentication results to the PC 4, and then the PC 4 recognizes that the IC card 1 and the reader/writer 2 have not authenticated each other. When the PC 4 recognizes this situation, it indicates an error message by the use of a display means provided in the reader/writer 2 to notify the holder of the IC card 1 that an error has occurred.

Figure 6:
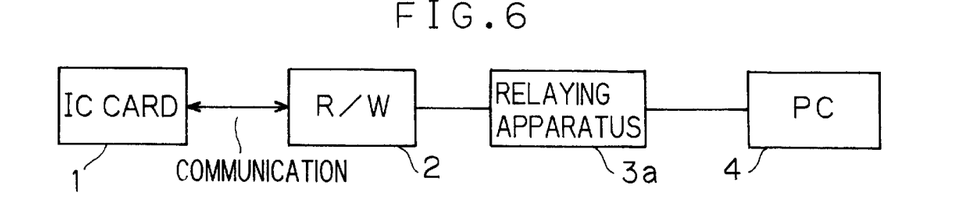
FIG. 6 is a block diagram showing the configuration of the communications system of a second embodiment of the invention.
Figure 7:
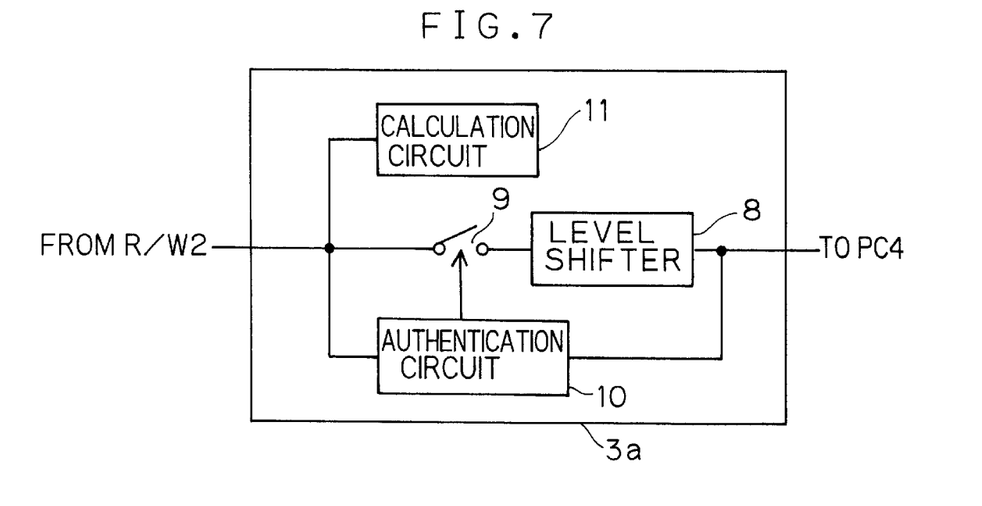
FIG. 7 is a block diagram showing the internal configuration of the relaying apparatus employed in the communications system shown in FIG. 6.

Next, a second embodiment of the present invention will be described with reference to the drawings relevant thereto. FIG. 6 is a block diagram showing the communications system of this embodiment. FIG. 7 is a block diagram showing the internal configuration of the relaying apparatus employed in this embodiment. The communications system shown in FIG. 6 is composed of a reader/writer 2 functioning as a communications terminal for communicating with an IC card 1 on a non-contact basis and having an internal configuration as shown in FIG. 3, a relaying apparatus 3a connected to the reader/writer 2, and a PC 4 connected to the reader/writer 2 and functioning as a control apparatus for controlling the reader/writer 2.

As shown in FIG. 7, the relaying apparatus 3a has a level shifter 8 for converting the voltage level of the signals exchanged in communication with the reader/writer 2 to the voltage level of the signals exchanged in communication with the PC 4 and vice versa, a switch 9 for connecting and disconnecting the data transfer path between the PC 4 and the level shifter 8, an authentication circuit 10 for detecting an authentication signal transmitted from the reader/writer 2 so as to authenticate the reader/writer 2 on the basis of the authentication signal, and a calculation circuit 11 for performing a predetermined calculation operation f1( ) on the authentication signal transmitted from the reader/writer 2.

This communications system, employing a relaying apparatus 3 configured as described above, operates in the same way as shown in the time charts of FIGS. 4 and 5 described previously in connection with the first embodiment. Specifically, the reader/writer 2 and the relaying apparatus 3a, by checking whether or not the authentication signal they receive has already been subjected to the calculation operation f1( ) or f2( ) using their respective authentication circuits 24 and 10, authenticate each other and then transmit back an authentication signal obtained by performing the calculation operation f2( ) or f1( ) on the received authentication signal using their respective calculation circuits 25 and 11.

After such mutual authentication processes have been performed between the reader/writer 2 and the relaying apparatus 3a and they have authenticated each other, the reader/writer 2 transmits from its tuning circuit 21 a weak radio wave to check whether an IC card 1 is located sufficiently close thereto or not. Moreover, to recognize whether the reader/writer 2 has recognized an IC card 1 or not, the relaying apparatus 3a transmits an authentication signal to the reader/writer 2 at regular intervals. When the reader/writer 2 recognizes that an IC card 1 is located sufficiently close thereto, the reader/writer 2 checks whether the relaying apparatus 3a is authentic or not on the basis of the authentication signal that the relaying apparatus 3a transmits after having authenticated the reader/writer 2. Then, the control circuit 23 produces a command signal to which this authentication signal is added after being subjected to the calculation operation f2( ). This command signal is then modulated by the modulation/demodulation circuit 22 and is then transmitted from the tuning circuit 21.

When the IC card 1 receives the command signal transmitted from the reader/writer 2, it checks whether or not the authentication signal detected from this command signal has already been subjected to the calculation operation f2( ), and transmits back a response signal to which this authentication signal is added after being subjected to the calculation operation f3( ). To this response signal, data indicating whether the IC card 1 has become ready for communication or not is also added on the basis of the authentication result.

When the reader/writer 2 receives this response signal through its tuning circuit 21, the modulation/demodulation circuit 22 demodulates it and then the control circuit 23 detects the authentication signal therefrom. Moreover, here, the control circuit 23, on the basis of this response signal, recognizes whether the IC card 1 has become ready for communication or not. Then, the authentication circuit 24 checks whether or not the authentication signal detected by the control circuit 23 has already been subjected to the calculation operation f3( ). Here, if the IC card 1 is authenticated on the basis of the authentication signal, the authentication signal detected by the control circuit 23 is subjected to the calculation operation f2( ) performed by the calculation circuit 25, and is then transmitted to the relaying apparatus 3a.

When the relaying apparatus 3a receives this authentication signal, the authentication circuit 10 checks whether or not this authentication signal has already been subjected to the calculation operation f2( ). Here, the authentication signal is recognized as having already been subjected to the calculation operation f2( ), and thus the reader/writer 2 is authenticated. Accordingly, the switch 9 is closed (brought into a connected state) to connect together the reader/writer 2 and the PC 4, which have thus far been disconnected from each other, by way of a data transfer line. Now, the IC card 1 can communicate with the PC 4 through the reader/writer 2 and the relaying apparatus 3a.

In this communications system having an authentication function, since a level shifter 8 is provided in the relaying apparatus 3a, it is possible to design the PC 4 side input/output interface to conform to the RS-232C standard and the reader/writer 2 side input/output interface to conform to the RS-485 standard. By designing the reader/writer 2 side input/output interface to conform to the RS-485 standard in this way, it is possible to extend the permissible distance between the reader/writer 2 and the relaying apparatus 3a up to 100 m at the maximum.

It is to be noted that, also in the communications system of the first embodiment, it is possible to provide a level shifter 8, as employed in the second embodiment, within the relaying apparatus 3, between the multiplexer 5 and the PC 4. This makes it possible to design the reader/writer 2-1 to 2-n side input/output interface to conform to the RS-485 standard and thereby extend the permissible distance therebetween.

Although the above-described embodiments deal only with cases where communication is achieved on a non-contact basis by the use of IC cards, it is also possible to use transponders such as magnetic cards designed for data communication on a contact basis. Where communication is achieved on a contact basis, instead of providing the reader/writer with a tuning circuit for exchanging signals with a transponder as employed in the first and second embodiments, the reader/writer is provided with an input/output interface that permits the reader/writer to communicate with a transponder.

According to the present invention, in a communications system, a relaying apparatus having an authentication circuit controls the switching of the data transfer lines between a plurality of communications terminals and a central control apparatus. This makes it possible to detect inauthentic communications terminals. Moreover, it is possible to control a plurality of communications terminals with a single central control apparatus. Moreover, by providing a level shifter in the relaying apparatus, it is possible to design the communications terminal side interface to conform to, for example, the RS-485 standard that permits stable communication over a relatively long distance and thereby extend the permissible distance between the relaying apparatus and the communications terminals. Furthermore, by providing an authentication circuit in each communications terminal to permit it to check whether an external communications apparatus is authentic or not, it is possible to disconnect the data transfer path between the communications terminal and the external communications apparatus when communication is requested from an inauthentic communications apparatus. This makes it possible to realize a communications system offering higher security.

What is claimed is:

1. A communications system having an authentication function comprising:

a plurality of communications terminals communicating individually with external communications apparatuses;

a central control apparatus controlling the communications terminals and exchanging data related to the communications terminals and the external communications apparatuses with the communications terminals; and a relaying apparatus composed of a switching portion selectively connecting one of the communications terminals to the central control apparatus and a central authentication circuit checking whether the individual communications terminals are authentic or not, wherein first the central authentication circuit of the relaying apparatus checks whether the communications terminals are authentic or not to prohibit whichever of the communications terminals is found unauthentic from being connected to the central control apparatus for communication therewith, then the relaying apparatus selects, as communications terminals to be connected to the central control apparatus, those of the communications terminals which have been found authentic by the central authentication circuit, and then the external communications apparatuses communicate with the central control apparatus through the communications terminals selected by the relaying apparatus and the relaying apparatus itself, and wherein the external communications apparatuses communicate with the central control apparatus through the communications terminals selected by the relaying apparatus and the relaying apparatus itself.

2. A communications system having a authentication function as claimed in claim 1, wherein the switching portion is a multiplexer that selectively connects one of the communications terminals to the central control apparatus but that does not select any of the communications terminals that have been found to be inauthentic by the central authentication circuit so as to prohibit those inauthentic communications terminals from communicating with the central control apparatus.

3. A communications system having an authentication function as claimed in claim 1, wherein the communications terminals are provided individually with local authentication sections for checking whether the external communications apparatuses are authentic or not, and wherein local authentication processes performed by the local authentication sections provided in the individual communications terminals to check whether the external communications apparatuses are authentic or not are performed independently of central authentication processes performed by the central authentication circuit provided in the relaying apparatus to check whether the individual communications terminals are authentic or not.

4. A communications system having an authentication comprising:

a plurality of communications terminals communicating individually with external communications apparatuses, the communications terminals being provided individually with local authentication sections for checking whether the external communications apparatuses are authentic or not;

a central control apparatus for controlling the communications terminals and for exchanging data related to the communications terminals and the external communications apparatuses with the communications terminals; and a relaying apparatus composed of a switching portion for selectively connecting one of the communications terminals to the central control apparatus and a central authentication circuit for checking whether the individual communications terminals are authentic or not, wherein local authentication processes performed by the local authentication sections provided in the individual communications terminals to check whether the external communications apparatuses are authentic or not are performed independently of central authentication processes performed by the central authentication circuit provided in the relaying apparatus to check whether the individual communications terminals are authentic or not, wherein the central authentication circuit provided in the relaying apparatus checks whether a communications terminal is authentic or not by detecting an authentication signal that is added, for use in a central authentication process, to a signal transmitted from the communications terminal, and wherein the relaying apparatus performs a predetermined calculation operation on this authentication signal to produce and feed to the communications terminal a signal on a basis of which the communications terminal checks whether the relaying apparatus is authentic or not, and wherein the external communications apparatuses communicate with the central control apparatus through the communications terminals selected by the relaying apparatus and the relaying apparatus itself.

5. A communications system having an authentication function as claimed in claim 3, wherein the communications terminals are provided individually with local authentication sections for checking whether the external communications apparatuses are authentic or not, wherein, when an external communications apparatus has been found to be authentic by the local authentication section provided in a communications terminal, a signal indicating that the external communications apparatus is authentic is transmitted from the communications terminal to the relaying apparatus, wherein, on a basis of this signal transmitted from the communications terminal, the central authentication circuit provided in the relaying apparatus checks whether the communications terminal is authentic or not, and wherein, when the central authentication circuit has found the communications terminal to be authentic, the switching portion connects the communications terminal to the central control apparatus to permit them to communicate with each other, wherein, on a basis of this signal transmitted from the communications terminal, the central authentication circuit provided in the relaying apparatus checks whether the communications terminal is authentic or not.

6. A communications system having an authentication comprising:

a plurality of communications terminals communicating individually with external communications apparatuses, the communications terminals being Provided individually with local authentication sections for checking whether the external communications apparatuses are authentic or not;

a central control apparatus for controlling the communications terminals and for exchanging data related to the communications terminals and the external communications apparatuses with the communications terminals; and a relaying apparatus composed of a switching portion for selectively connecting one of the communications terminals to the central control apparatus and a central authentication circuit for checking whether the individual communications terminals are authentic or not, wherein, when an external communications apparatus has been found to be authentic by the local authentication section provided in a communications terminal, a signal indicating that the external communications apparatus is authentic is transmitted from the communications terminal to the relaying apparatus, wherein, on a basis of this signal transmitted from the communications terminal, the central authentication circuit provided in the relaying apparatus checks whether the communications terminal is authentic or not, wherein, in the relaying apparatus, the central authentication circuit checks whether the communications terminal is authentic or not by detecting the signal indicating that the external communications apparatus is authentic, and performs a predetermined calculation operation on this detected signal to produce a signal on a basis of which the communications terminal checks whether the relaying apparatus is authentic or not, wherein, when the central authentication circuit has found the communications terminal to be authentic, the switching portion connects the communications terminal to the central control apparatus to permit them to communicate with each other, and wherein the external communications apparatuses communicate with the central control apparatus through the communications terminals selected by the relaying apparatus and the relaying apparatus itself.

7. A communications system having a authentication function, comprising:
- a plurality of communications terminals for communication individually with external communications apparatuses;
- a central control apparatus for controlling the communications terminals and for exchanging data related to the communications terminals and the external communications apparatuses with the communications terminals; and
- a relaying apparatus composed of a level shifter for converting a voltage level of signals transmitted from the central control apparatus to a voltage level that can be received by communications terminals and for converting a voltage level of signals transmitted from the communications terminals to a voltage level that can be received by the central control apparatus, a central authentication circuit for checking whether the individual communications terminals are authentic or not, and a switching portion for connecting or disconnecting data transfer lines between the central control apparatus and the communications terminals on a basis of outputs from the authentic circuit,
- wherein
  - first the central authentication circuit of the relaying apparatus checks whether the communications terminals are authentic or not to prohibit whichever of the communications terminals is found unauthentic from being connected to the central control apparatus for communication therewith,
  - then the relaying apparatus selects, as communications terminals to be connected to the central control apparatus, those of the communications terminals which have been found authentic by the central authentication circuit, and
  - then the external communications apparatuses communicate with the central control apparatus through communications terminals selected by the relaying apparatus and the relaying apparatus itself.

8. A communications system having an authentication function as claimed in claim 7,
- wherein the communications terminals are provided individually with local authentication sections for checking whether the external communications apparatuses are authentic or not, and
- wherein local authentication processes performed by the local authentication sections provided in the individual communications terminals to check whether the external communications apparatuses are authentic or not are performed independently of central authentication processes performed by the central authentication circuit provided in the relaying apparatus to check whether the individual communications terminals are authentic or not.

9. A communications system having an authentication function, comprising:
- a plurality of communications terminals communicating individually with external communications apparatuses, the communications terminals being provided individually with local authentication sections for checking whether the external communications apparatuses are authentic or not;
- a central control apparatus for controlling the communications terminals and for exchanging data related to the communications terminals and the external communications apparatuses with the communications terminals; and
- a relaying apparatus composed of a level shifter for converting a voltage level of signals transmitted from the central control apparatus to a voltage level that can be received by communications terminals and for converting a voltage level of signals transmitted from the communications terminals to a voltage level that can be received by the central control apparatus, a central authentication circuit for checking whether the individual communications terminals are authentic or not, and a switching portion for connecting or disconnecting data transfer lines between the central control apparatus and the communications terminals on a basis of outputs from the authentic circuit,
- wherein local authentication processes performed by the local authentication sections provided in the individual communications terminals to check whether the external communications apparatuses are authentic or not are performed independently of central authentication processes performed by the central authentication circuit provided in the relaying apparatus to check whether the individual communications terminals are authentic or not,
- wherein the central authentication circuit provided in the relaying apparatus checks whether a communications terminal is authentic or not by detecting an authentication signal that is added, for use in a central authentication process, to a signal transmitted from the communications terminal,
- wherein the relaying apparatus performs a predetermined calculation operation on this authentication signal to produce and feed to the communications terminal a signal on a basis of which the communications terminal checks whether the relaying apparatus is authentic or not, and
- wherein the external communications apparatuses communicate with the central control apparatus through the communications terminals selected by the relaying apparatus and the relaying apparatus itself.

10. A communications system having an authentication function as claimed in claim 8,
- wherein the communications terminals are provided individually with local authentication sections for checking whether the external communications apparatuses are authentic or not,
- wherein when the external communications apparatus has been found to be authentic by the local authentication section provided in a communications terminal, a signal indicating that the external communications apparatus is authentic is transmitted from the communications terminal to the relaying apparatus,
- wherein, on a basis of this signal transmitted from the communications terminal, the central authentication circuit provided in the relaying apparatus checks whether the communications terminal is authentic or not, and
- wherein, when the central authentication circuit has found the communications terminal to be authentic, the switching portion connects the communications terminal to the central control apparatus to permit them to communicate with each other.

11. A communications system having an authentication function, comprising:

a plurality of communications terminals communicating individually with external communications apparatuses, the communications terminals being provided individually with local authentication sections for checking whether the external communications apparatuses are authentic or not;

a central control apparatus for controlling the communications terminals and for exchanging data related to the communications terminals and the external communications apparatuses with the communications terminals; and a relaying apparatus composed of a level shifter for converting a voltage level of signals transmitted from the central control apparatus to a voltage level that can be received by communications terminals and for converting a voltage level of signals transmitted from the communications terminals to a voltage level that can be received by the central control apparatus, a central authentication circuit for checking whether the individual communications terminals are authentic or not, and a switching portion for connecting or disconnecting data transfer lines between the central control apparatus and the communications terminals on a basis of outputs from the authentic circuit, wherein, when the external communications apparatus has been found to be authentic by the local authentication section provided in a communications terminal, a signal indicating that the external communications apparatus is authentic is transmitted from the communications terminal to the relaying apparatus, wherein, on a basis of this signal transmitted from the communications terminal, the central authentication circuit provided in the relaying apparatus checks whether the communications terminal is authentic or not, and wherein, in the relaying apparatus, the central authentication circuit checks whether the communications terminal is authentic or not by detecting the signal indicating that the external communications apparatus is authentic, and performs a predetermined calculation operation on this detected signal to produce a signal on a basis of which the communications terminal checks whether the relaying apparatus is authentic or not, wherein, when the central authentication circuit has found the communications terminal to be authentic, the switching portion connects the communications terminal to the central control apparatus to permit them to communicate with each other, and wherein the external communications apparatuses communicate with the central control apparatus through the communications terminals selected by the relaying apparatus and the relaying apparatus itself.

12. A communications system having an authentication function, comprising:

a plurality of communications terminals for communicating individually with external communications apparatuses;

a central control apparatus for controlling the communications terminals and for exchanging data related to the communications terminals and the external communications apparatuses with the communications terminals; and a relaying apparatus composed of a switching portion for selectively connecting one of the communications terminals to the central control apparatus and a central authentication circuit for checking whether the individual communications terminals are authentic or not, wherein the central authentication circuit provided in the relaying apparatus checks whether a communications terminal is authentic or not by detecting an authentication signal that is added, for use in a central authentication process, to a signal transmitted from the communications terminal, and wherein the relaying apparatus performs a predetermined calculation operation on this authentication signal to produce and feed to the communications terminal a signal on a basis of which the communications terminal checks whether the relaying apparatus is authentic or not.

13. A communications system having an authentication function, comprising:

a plurality of communications terminals for communicating individually with external communications apparatuses;

a central control apparatus for controlling the communications terminals and for exchanging data related to the communications terminals and the external communications apparatuses with the communications terminals; and a relaying apparatus composed of a level shifter for converting a voltage level of signals transmitted from the central control apparatus to a voltage level that can be received by communications terminals and for converting a voltage level of signals transmitted from the communications terminals to a voltage level that can be received by the central control apparatus, a central authentication circuit for checking whether the individual communications terminals are authentic or not, and a switching portion for connecting or disconnecting data transfer lines between the central control apparatus and the communications terminals on a basis of outputs from the authentication circuit, wherein the central authentication circuit provided in the relaying apparatus checks whether a communications terminal is authentic or not by detecting an authentication signal that is added, for the use in a central authentication process, to a signal transmitted from the communications terminal, and wherein the relaying apparatus performs a predetermined calculation operation on this authentication signal to produce and feed to the communications terminal a signal on a basis of which the communications terminal checks whether the relaying apparatus is authentic or not.

* * * * *